United States Patent [19]

Hayashi

[11] Patent Number: 5,577,182
[45] Date of Patent: *Nov. 19, 1996

[54] IMAGE PROCESSING APPARATUS

[75] Inventor: Kazuo Hayashi, Kanagawa, Japan

[73] Assignee: Fuji Xerox Co., Ltd., Tokyo, Japan

[ * ] Notice: The term of this patent shall not extend beyond the expiration date of Pat. No. 5,426,733.

[21] Appl. No.: 326,041

[22] Filed: Oct. 19, 1994

[30] Foreign Application Priority Data

Oct. 26, 1993 [JP] Japan .................................. 5-267650

[51] Int. Cl.⁶ ....................................................... G06T 3/00
[52] U.S. Cl. ........................................... 395/137; 395/133
[58] Field of Search ..................................... 395/137, 133, 395/129–132, 145–148, 162–166

[56] References Cited

U.S. PATENT DOCUMENTS 5,426,733 6/1995 Masui ....................................... 395/137

Primary Examiner—Almis R. Jankus
Attorney, Agent, or Firm—Finnegan, Henderson, Farabow, Garrett & Dunner, L.L.P.

[57] ABSTRACT

An image processing apparatus which performs a rotating process at a specified angle on the image data entered into it and forms image data as processed for rotation thereof on a page memory device. In the image processing apparatus, it is possible to perform a rotating process at a specified angle on the image data which are different in the number of bits per one pixel, using the same device, by performing the processing operations in the writing/reading address generating units and by controlling the changeover of the operations by the image data synthesizing unit, in accordance with a preset value indicating the image structure information in the image data entered into the image processing apparatus. Above all, it is possible for the image processing apparatus efficiently to perform the processes for rotating the image data by 0 degree, 90 degrees, 180 degrees, and 270 degrees.

4 Claims, 12 Drawing Sheets

FIG. 15

|←——————— 32 BITS ———————→|

| PIXEL AT MSB SIDE OF Reg1 | PIXEL AT MSB SIDE OF Reg2 | PIXEL AT MSB SIDE OF Reg3 | | PIXEL AT MSB SIDE OF Reg6 | PIXEL AT MSB SIDE OF Reg7 | PIXEL AT MSB SIDE OF Reg8 |
|---|---|---|---|---|---|---|
| PIXEL AT LSB SIDE OF Reg1 | PIXEL AT LSB SIDE OF Reg2 | PIXEL AT LSB SIDE OF Reg3 | | PIXEL AT LSB SIDE OF Reg6 | PIXEL AT LSB SIDE OF Reg7 | PIXEL AT LSB SIDE OF Reg8 |
| PIXEL AT MSB SIDE OF Reg9 | PIXEL AT MSB SIDE OF Reg10 | PIXEL AT MSB SIDE OF Reg11 | | PIXEL AT MSB SIDE OF Reg14 | PIXEL AT MSB SIDE OF Reg15 | PIXEL AT MSB SIDE OF Reg16 |
| | | | | | | |
| PIXEL AT LSB SIDE OF Reg17 | PIXEL AT LSB SIDE OF Reg18 | PIXEL AT LSB SIDE OF Reg19 | | PIXEL AT LSB SIDE OF Reg22 | PIXEL AT LSB SIDE OF Reg23 | PIXEL AT LSB SIDE OF Reg24 |
| PIXEL AT MSB SIDE OF Reg25 | PIXEL AT MSB SIDE OF Reg26 | PIXEL AT MSB SIDE OF Reg27 | | PIXEL AT MSB SIDE OF Reg30 | PIXEL AT MSB SIDE OF Reg31 | PIXEL AT MSB SIDE OF Reg32 |
| PIXEL AT LSB SIDE OF Reg25 | PIXEL AT LSB SIDE OF Reg26 | PIXEL AT LSB SIDE OF Reg27 | | PIXEL AT LSB SIDE OF Reg30 | PIXEL AT LSB SIDE OF Reg31 | PIXEL AT LSB SIDE OF Reg32 | or structure) and the bit width per one word in a page memory device 300 for putting out the image data as processed for a rotation thereof and writing alternately to two buffer memory devices 207 and 208 by the above-mentioned block as the unit.

IMAGE PROCESSING APPARATUS

BACKGROUND OF THE INVENTION

1. Field of the Invention

The present invention relates to an image processing apparatus which performs a rotating process at a specified angle on the image data entered into it and forms image data as processed for rotation thereof on a page memory device.

2. Description of the Related Art

A conventional image processing apparatus which is capable of executing a rotating process on entered image data at an angle corresponding to an integral number of times of 90 degrees at a high velocity is taught in Japanese Patent Unexamined Publication No. Hei. 5-108812. FIG. 17 is a block diagram illustrating an outline of the construction of the conventional image processing apparatus, which processes as one block the sequentially entered image data for a number of lines in accordance with the ratio of the bit width per one pixel indicating the number of tonal ranges of one pixel (hereinafter referred to as an image structure) and the bit width per one word in a page memory device 300 for putting out the image data as processed for a rotation thereof and writing alternately to two buffer memory devices 207 and 208 by the above-mentioned block as the unit.

Then, the image processing apparatus sequentially reads the image data for one block as written to the buffer memory devices 207 and 208 from the reading addresses generated by a buffer memory reading control unit 212 in accordance with the angle of rotation and generates the data for one word in the page memory device 300 by performing a rearrangement and a rotating process at a specified angle on the data thus read out. Then, by writing the word data to an address in the page memory device 300 as calculated in accordance with the specified angle of rotation, the image processing apparatus is capable of performing a rotating process as indicated on the sequentially entered image data and developing the image data on the page memory device 300.

Now, more and more intensive development work has been carried out in recent years on an image processing apparatus which, being used in a single unit, is capable of processing a plural number of types of image data different in image structure, such as a case of a multi-function equipment having the functions of a copying machine, a printer, and a facsimile machine integrated in one unit or a multi-media processing equipment, and it is therefore required of a single unit of such an image processing apparatus built in such an equipment to be capable of performing an image data rotating process on a plural number of types of image data different in image structure.

However, the image processing apparatus disclosed in Japanese Patent Unexamined Publication No. Hei. 5-108812 is not capable of fulfilling the above-mentioned requirement since the image structure of the image data which the image processing apparatus takes up as an object of an image rotating process is limited to one type because the width of the data written to the buffer memory devices 207 and 208 and the width of the data read out of the same buffer memory devices are determined by the image structure.

In contrast with this, it is conceivable to provide a device for performing a rotating process for each of the types of image data different in image structure, but a construction with such a device will not only require a large system, but will also entail an increase in cost.

Further, the construction of the image processing apparatus disclosed in Japanese Patent Unexamined Publication No. Hei. 5-108812 will be able to perform a rotating process without taking any recourse to any image structure, provided that the image processing apparatus is designed in such a manner as to perform a rotating process by writing one pixel after another of the image data having any image structure in a range not exceeding the data width in the buffer memory devices 207 and 208, but, in such a case, this construction will present a problem in that the image processing apparatus needs an extended length of time for its performance of a rotating process in the event that the image data are in a large amount of data because the processing velocity is determined by the number of pixels in the input data.

Furthermore, with the image processing apparatus disclosed in Japanese Patent Unexamined Publication No. Hei. 5-108812, it is conceivable to perform a rotating process by executing a writing/reading operation with a plural number of pieces of pixel data packed in a data width in the buffer memory devices 207 and 208, but, in such a case, the number of the patterns to be used in the processing of a rearranging operation of the image data read out of the buffer memory devices 207 and 208 will be the number obtained by (the number of modes of the angle of rotation×the number of image structures to be subjected to a rotating process), so that the construction of the image processing apparatus not only necessarily involves greater complexity in its processing operations but also inevitably requires a larger scale in its circuitry.

SUMMARY OF THE INVENTION

The present invention has been made in consideration of the above-mentioned problems of the conventional image processing apparatuses, and it is an object of the present invention to offer an image processing apparatus which works with a small circuit construction and yet is capable of performing a rotating process at a specified angle on a plural number of types of image data respectively different in image structure.

In order to attain the object described above, the present invention provides an image processing apparatus which puts out image information having data in N bits for one pixel (where N is an integral number not less than one) to a page memory device capable of making access to the image information by M bits (where M is an integral number larger than N) as a unit while performing a rotating process on the image information, the image processing apparatus including: a buffer memory device, which is capable of making access by W bits as a unit (where W is an integral number satisfying the following condition, N<W≦M); writing control means, which works for sequentially entering image information for (M/N) lines as a unit, also for sequentially generating addresses in a prescribed order on the basis of image size information, and for sequentially writing the image information for each unit thus entered to the buffer memory device for every (W/N) pixels; reading control means, which works for sequentially generating addresses in accordance with an angle of rotation and for sequentially reading the image information for the (M/N) lines out of the image information stored in the buffer memory device; an image data synthesizing unit, which generates (W/N) pieces of data in M bits from the M pieces of data as sequentially read out by the reading control means on the basis of the angle of rotation and the number N of bits per one pixel; and image output means, which sequentially generates addresses in accordance with the angle of rotation and puts out the (W/N) pieces of data generated by the image data synthesizing unit to individual corresponding addresses in the page memory device.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 15 is a chart illustrating the particulars of the arrangement converting process performed in a case in which the rotating angle is 90 degrees and 270 degrees and one pixel is formed of four bits;

DETAILED DESCRIPTION OF THE PREFERRED EMBODIMENTS

Figure 1:
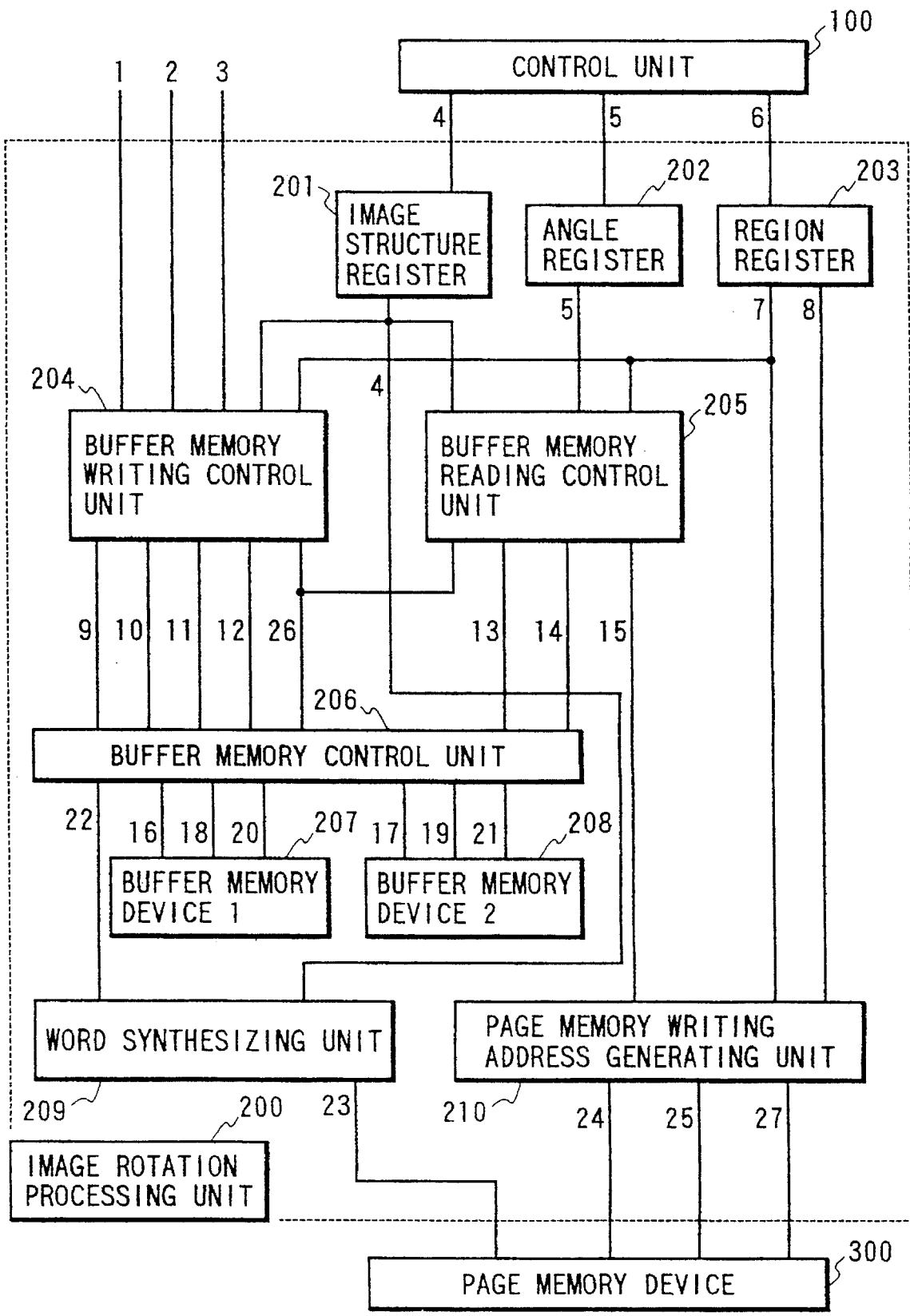
FIG. 1 is a block diagram illustrating the construction of an image processing apparatus in an example of preferred embodiment of the present invention.

In the following part, a description will be made of the examples of preferred embodiments of the present invention with reference to the accompanying drawings. The examples of preferred embodiments will be described hereinafter, with the types of the image data to be entered being classified into three types, namely, one bit for one pixel (1 Bit/Pixel: N=1, where N expresses the number of information bits per one pixel), two bits per one pixel (2 Bits/Pixel: N=2), and four bits per one pixel (4 Bits/Pixel: N=4), with the buffer memory devices 207 and 208 being regarded as having a word width W of 8 bits, as having addresses consisting of 15 bits, and having a word width M composed of 32 bits in the page memory device 300, which is to store the image data after a rotating process has been performed thereon.

FIG. 1 is a block diagram illustrating the construction of the image processing apparatus in one example of preferred embodiment of the present invention, and, in this FIG. 1, reference numeral 100 designates a control unit for effecting a set-up necessary for performing an image rotating process, reference numeral 200 designates an image rotation processing unit, and reference numeral 300 designates a page memory device to which the image data as processed for their rotation are to be put out.

The image rotation processing unit 200 receives image data 3 to be subjected to a rotating process, which is to be performed in response to a hand-shake control of an image input demand signal 1 and an image input permitting signal 2, from an image input unit, which is not illustrated in the Figure.

Now, the image rotation processing unit 200 is provided with: an image structure register 201, an angle register 202, and a region register 203, on which image structure information 4, rotating angle information 5, and region information 6 indicating a region in which a rotating process is to be performed, are to be set up respectively, and the operating mode in which the image rotation processing unit 200 performs a rotating process on the image data 3 is determined by the values set on these registers 201, 202, and 203.

Further, the image rotation processing unit 200 is provided with two buffer memory devices 207 and 208, each of which has a capacity sufficient for accommodating the input image data for the M/N lines corresponding to the number N of tonal ranges for input pixels and the word width M in the page memory device 300. Then, the processing operation for writing the image data for the M/N lines to these buffer memory devices 207 and 208 and the processing operation for reading the image data for the M/N lines will be shifted alternately by a buffer memory control unit 206 between a buffer memory writing control unit 204, which is capable of dealing with a plural number of image structures, and a buffer memory reading control unit 205, which is capable of dealing with a plural number of image structures.

The condition which makes it possible to effect a shift between one and the other of these buffer memory devices 207 and 208 is found at the point in time when both an operation for writing to one of these buffer memory devices and an operation for reading from the other of these buffer memory devices have been completed, and the buffer memory control unit 206 generates a buffer memory switching signal at any point in time when it has become possible to switch from one to the other of the buffer memory devices.

The buffer memory writing control unit 204 is constructed in such a manner as to deal properly with a plural number of image structures, and the image structure information 4, which is limited by the control unit 100, and the input image size information 7, which is included in the region information 6, are put into this buffer memory writing control unit 204.

The buffer memory writing control unit 204 generates a buffer memory writing signal 10 and controls a buffer memory writing address 11 on the basis of the image structure information 4 and the input image size information 7, and performs a writing process on the entered image data 3 to the buffer memory devices 207 and 208.

Figure 2:
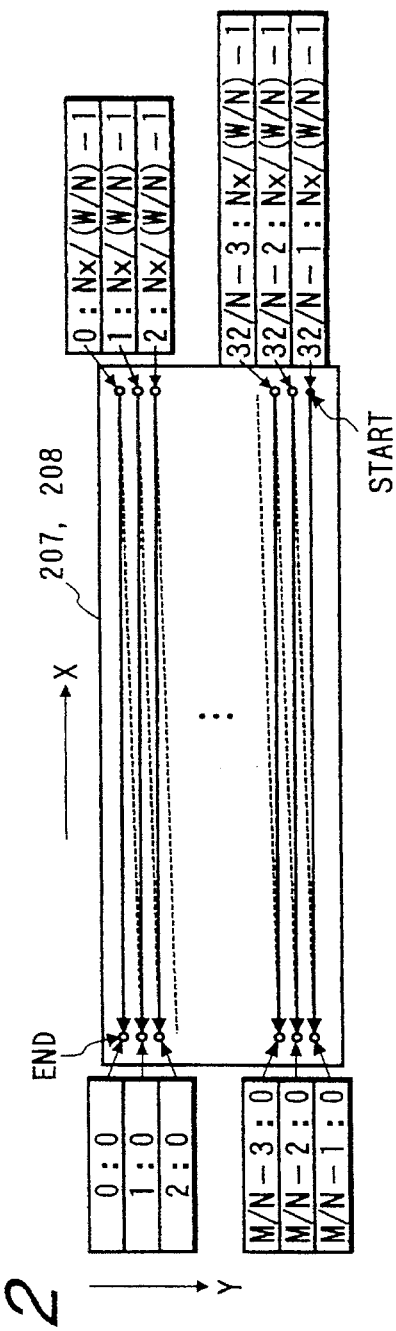
FIG. 2 is a chart illustrating the sequence of the generation of addresses for writing image data to buffer memory devices.
Figure 3:
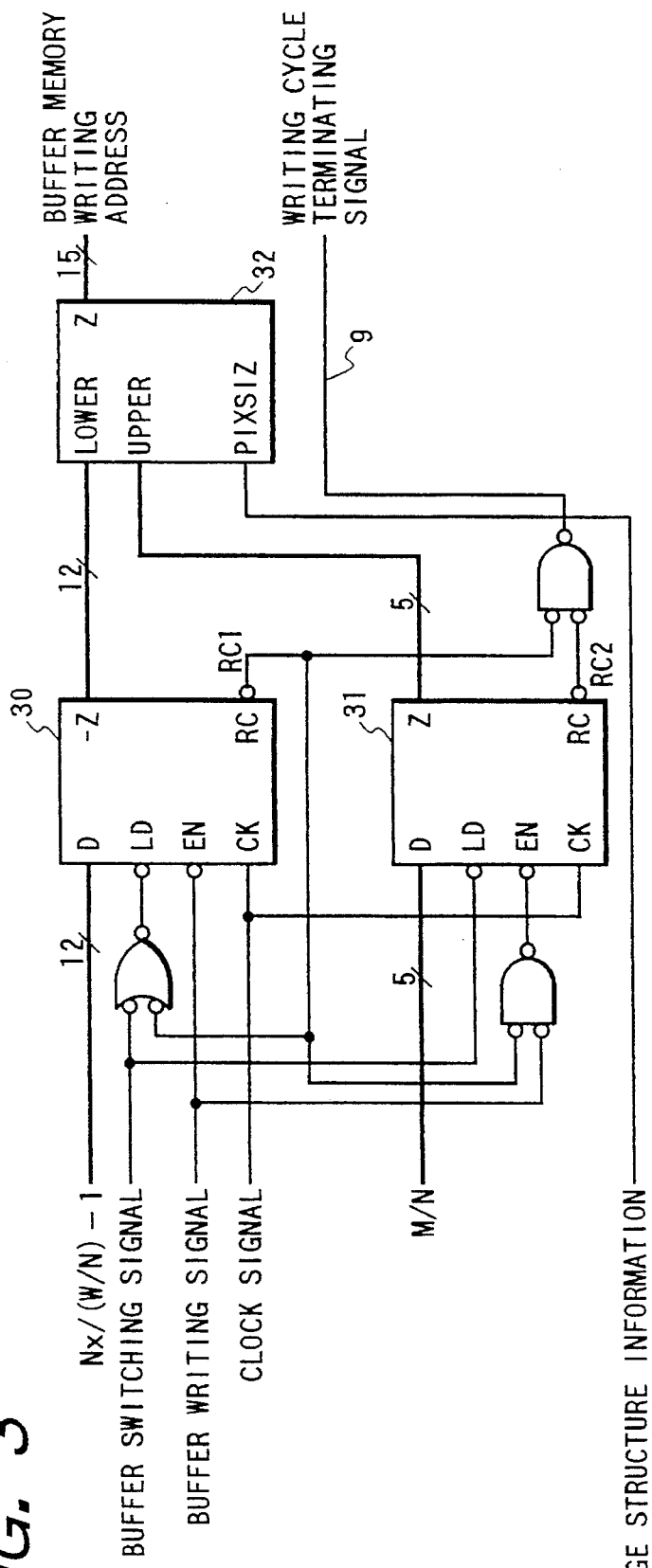
FIG. 3 is a block diagram illustrating the construction of a buffer memory writing address generating unit in a buffer memory writing control unit as shown in FIG. 1.

Next, with reference to FIGS. 2 and 3, a description will be made of the processing operation performed by the buffer memory writing control unit 204. FIG. 2 is a chart schematically illustrating the sequence of operations for the generation of a buffer memory writing address, and FIG. 3 is a block diagram illustrating an example of construction of the buffer memory writing address generating unit. Further, FIG. 2 shows the addresses in the main scanning direction in the direction X and shows the addresses in the line direction in the direction Y. In FIGS. 2 and 3, the mark $N_X$ indicates the number of pixels in the main scanning direction of the input image data. The same marks are used in the same way in the subsequent part of this specification.

The buffer memory writing address generating unit is provided, as shown in FIG. 3, with: a pixel data counting unit 30, which counts the number of words on one line of the image data 12 to be written to the buffer memory devices 207 and 208; a line data counting unit 31, which counts the number of lines entered; and a buffer memory writing address selector 32, which selects only the significant bits out of the output data from the pixel data counting unit 30 and the line data counting unit 31 on the basis of image structure information and generates an address for writing the image data to the buffer memory devices 207 and 208. In addition, the pixel data counting unit 30 and the line data counting unit 31 may be formed by a counter, and a down counter is to be used in this example of preferred embodiment.

The sequence in which the buffer memory writing addresses are generated is such as shown in FIG. 2, i.e., the addresses are generated from the position indicated by the term "Start" and in the manner as indicated by the solid line drawn from the "Start" position. That is to say, the address of the "Start" position in which the writing operation is to be started is $(32/N-1, N_X/(W/N)-1)$, from which the writing operation is performed toward the direction of $(M/N-1, 0)$ and then the writing operation is performed from $(32/N-2, N_X/(W/N)-1)$, which is positioned one line above the line on which the writing operation is started, to $(M/N-2, 0)$. The writing operation is performed in the same manner on any subsequent line.

Then, these writing addresses are generated in the sequence indicated in FIG. 2 in all the cases, without any dependence on the image structure or on the rotating angle.

The unit for the image data written to the buffer memory devices 207 and 208 (hereinafter referred to as a "block") is different for each different image structure, and image data for $(N_X/(W/N))$ bytes×$(M/N)$ lines are treated as one block.

The buffer memory writing control unit 204 also receives the input of the image structure information 4 and the input image size information 7 as set up by the control unit 100. The counting operation for the buffer memory writing addresses is to be performed in the descending order of the buffer memory writing addresses, and the allocation of the 15 bits forming the writing addresses to the buffer memory devices 207 and 208 is such that the most significant X-bits are used as line counting addresses while the least significant (15−X) bits are used as main scanning direction pixel number counting addresses.

Therefore, as the number of lines in one block in case the image structure of the image data subject to a rotating process is one pixel in one bit, the most significant five bits are used as the line counting addresses while the least significant ten bits are used as the main scanning direction pixel number counting addresses. In the case of one pixel in two bits, the most significant four bits are similarly used as the line number counting addresses while the least significant eleven bits are similarly used as the main scanning direction pixel number counting address. In the case of one pixel in four bits, the most significant three bits are used as the line number counting addresses while the least significant twelve bits are used as main scanning direction pixel number counting address.

Therefore, a twelve-bit down counter is to be used as the pixel data counting unit 30, a five-bit down counter is to be used as the line data counting unit 31, and the buffer memory writing address selector 32 allocates the fifteen bits of the writing addresses to the buffer memory devices 207 and 208 on the basis of the image structure information 4.

Now, when an image rotating process is started, the pixel data counting unit 30 is loaded with a value obtained by subtracting one from the number of words $(N_X/(W/N))$ in the main scanning direction while the line data counting unit 31 is loaded with a value obtained by subtracting one from the number of lines (M/N) in one block. Then, when the buffer memory writing signal 10 is put into an enabled state, the twelve-bit down counter in the pixel data counting unit 30 is put into a count enabled state, and the value indicated on the counter is counted down with the input of a clock signal. Thereafter, when the count value indicated on the pixel data counting unit 30 is reduced to zero after counting the clock signals for (the number of words in the main scanning direction−1), a writing completion signal RC1 is put out of the pixel data counting unit 30. When this writing completion signal RC1 is thus put out of the pixel data counting unit 30, then the count value indicated on the line indicator counting unit 31 is counted down, and also the value obtained by subtracting one from the number of words $(N_X/(W/N))$ in the main scanning direction is loaded again on the pixel data counting unit 30.

When the count values on both of the pixel data counting unit 30 and the line data counting unit 31 indicate zero after the operations described above are performed in repetition, the writing completion signal RC1 is put out of the pixel data counting unit 30 and the writing completion signal RC2 is put out of the line data counting unit 31, and a buffer memory writing process completion signal 9 is thereby put out.

Next, a description will be made of the buffer memory reading control unit 205.

The buffer memory reading control unit 205 is designed to deal properly with a plural number of image structures, and the image structure information 4 set up by the control unit 100, the rotating angle information 5, and the input image size information 7, as included in the region information 6, are entered into the buffer memory reading control unit 205. Then, on the basis of these types of information, the buffer memory reading control unit 205 performs control on the buffer memory reading addresses 11, and the buffer memory writing control unit 204 performs control for the performance of the operations for reading out the image data written to the buffer memory devices 207 and 208.

Figure 4:
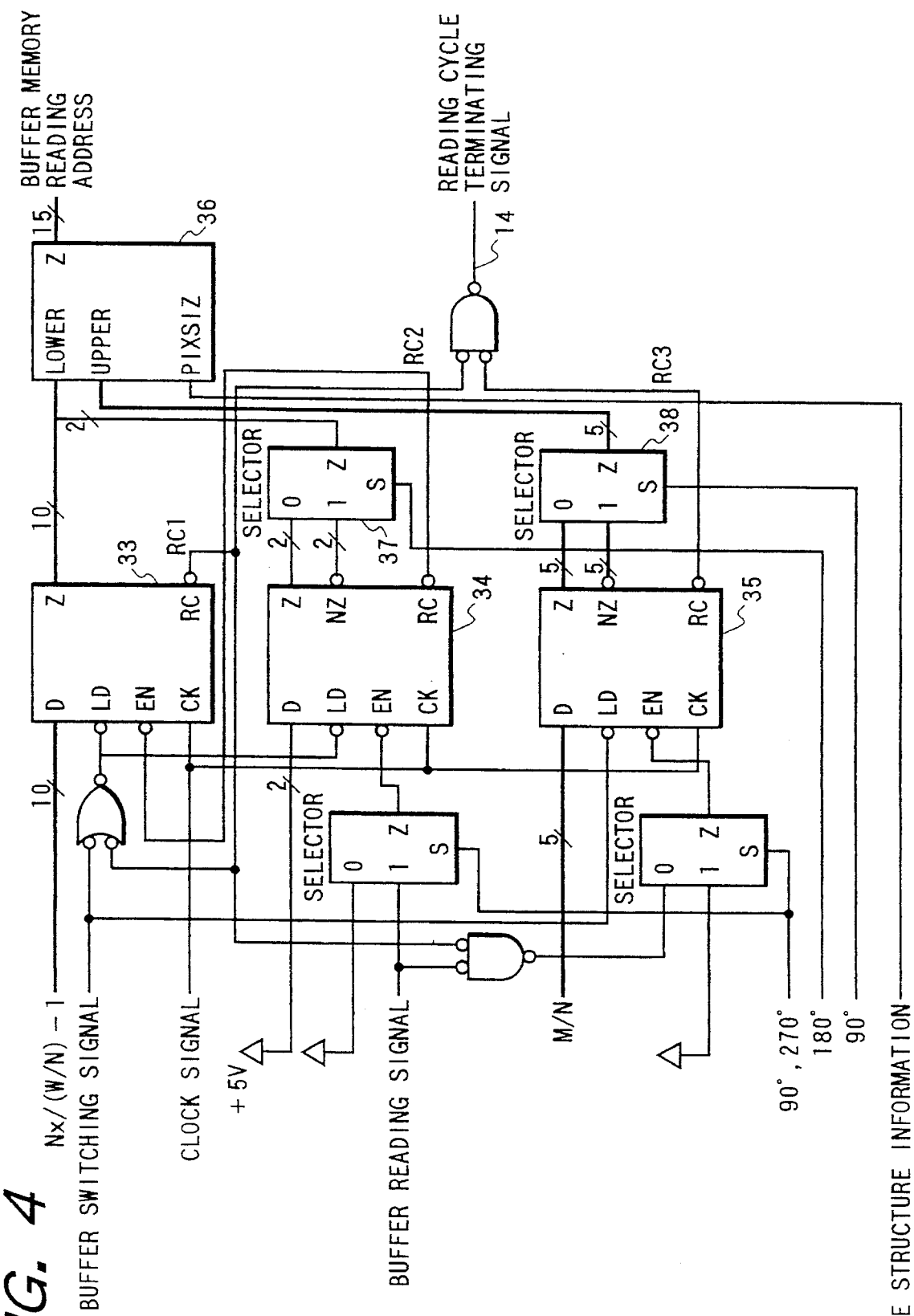
FIG. 4 is a block diagram illustrating the construction of a buffer memory reading address generating unit in a buffer memory reading control unit shown in FIG. 1.
Figure 5:
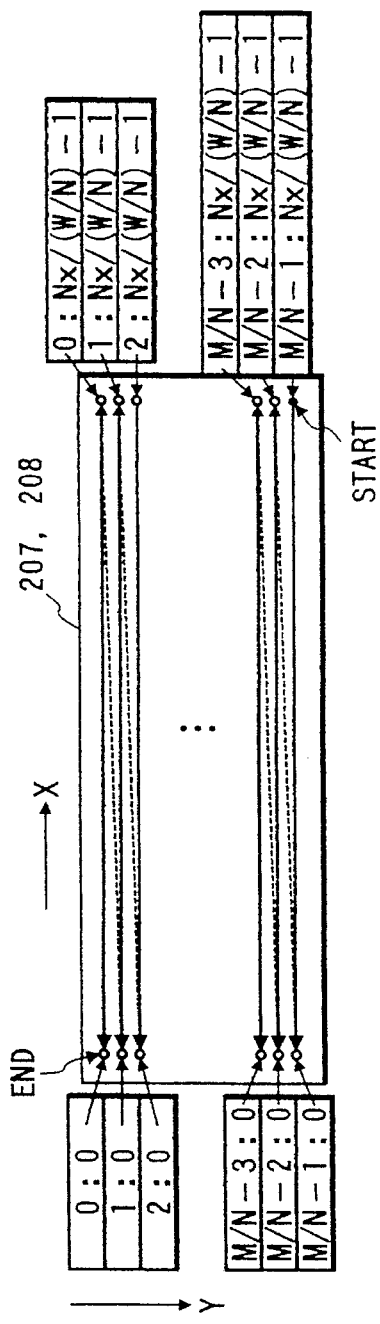
FIG. 5 is a chart illustrating the sequence for the generation of buffer memory reading addresses in a case in which the rotating angle is zero degree.
Figure 6:
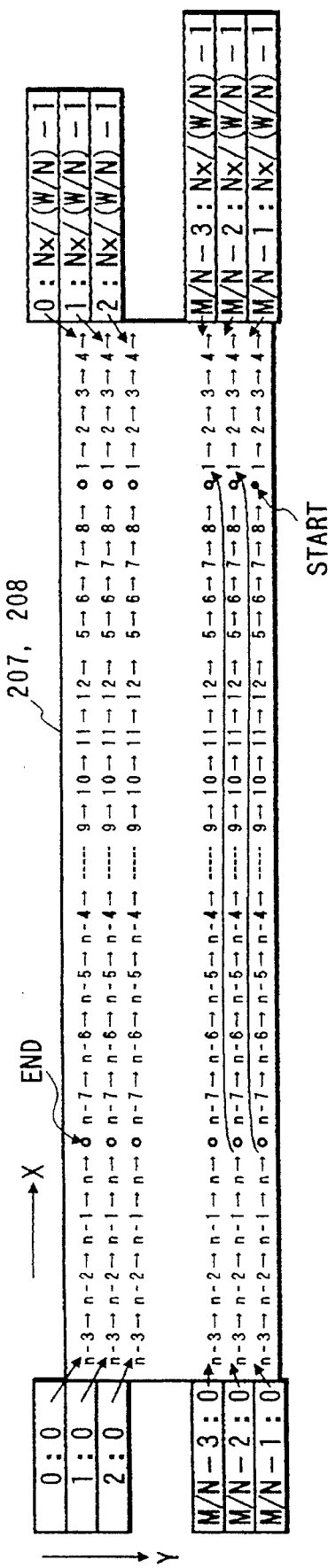
FIG. 6 is a chart illustrating the sequence for the generation of buffer memory reading addresses in a case in which the rotating angle is 180 degrees.
Figure 7:
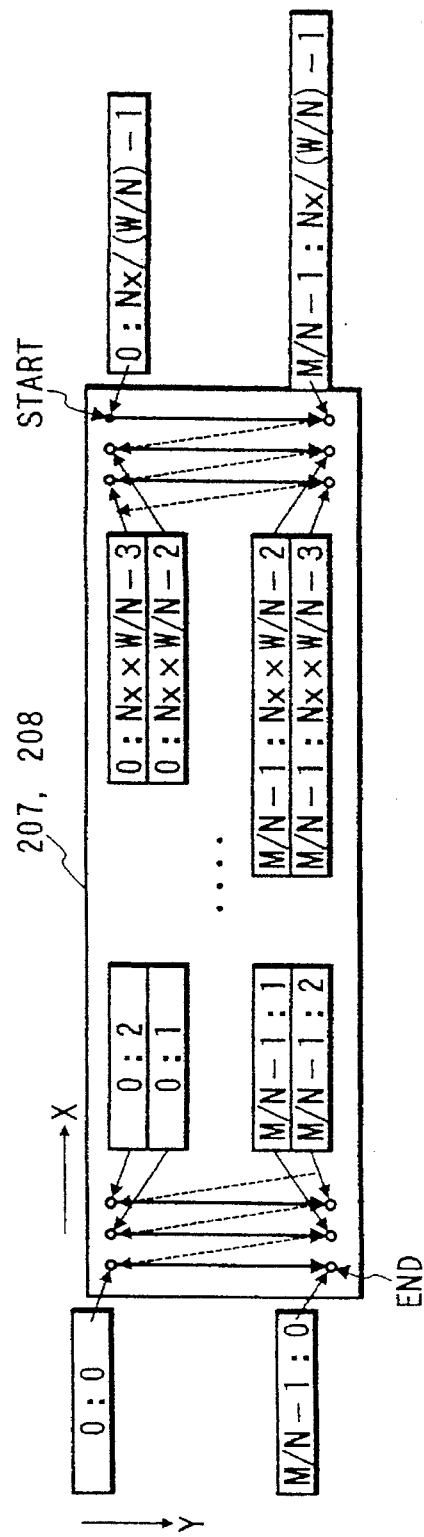
FIG. 7 is a chart illustrating the sequence for the generation of buffer memory reading addresses in a case in which the rotating angle is 90 degrees.
Figure 8:
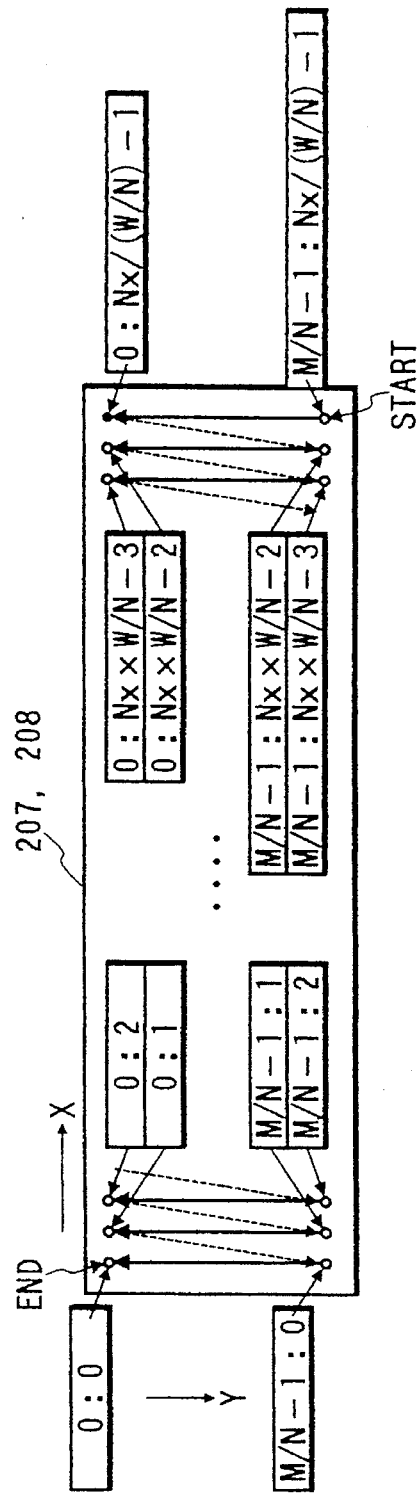
FIG. 8 is a chart illustrating the sequence for the generation of buffer memory reading addresses in a case in which the rotating angle is 270 degrees.

Next, with reference to FIGS. 4, 5, 6, 7, and 8, a description will be made of the processing operations performed by the buffer memory reading control unit 205. FIG. 4 is a block diagram illustrating an example of the construction of the buffer memory reading address generating unit provided in the buffer memory reading control unit 205. FIG. 5 is a chart illustrating the sequence for the generation of the buffer memory reading addresses in a case in which the rotating angle is zero degree. FIG. 6 is a chart illustrating the sequence for the generation of the buffer memory reading addresses in a case in which the rotating angle is 180 degrees. FIG. 7 is a chart illustrating the sequence for the generation of the buffer memory reading addresses in a case in which the rotating angle is 90 degrees. FIG. 8 is a chart illustrating the sequence for the generation of the buffer memory reading addresses in a case in which the rotating angle is 270 degrees.

The buffer memory reading address generating unit is provided with: pixel data counting units 33 and 34, which count the number of words on one line in the image data 22 read out of the buffer memory devices 207 and 208 by the buffer memory reading control unit 205; a line data counting unit 35, which counts the number of lines in the image data read out; a buffer memory reading address selector 36, which selects only the significant data from the output data from the pixel data counting units 33 and 34 and the output data from the line data counting unit 35 and generates addresses for reading the image data out of the buffer memory devices 207 and 208.

The sequence for the generation of the addresses for reading the image data out of one of the buffer memory devices does not depend on the image structure, but, as shown in FIGS. 5 through 8, the sequence for the generation of the addresses is different for a different angle of rotation. The unit of the image data to be read out of the buffer memory units 207 and 208 and the allocation of the fifteen bits of the addresses read out of the buffer memory devices 207 and 208 are the same as in the case of the writing process, and the image data for $(N_x/(W/N))$ bytes×(M/N) lines are treated as one block, and the allocation of the fifteen bits for the addresses for reading the image data to the buffer memory devices 207 and 208 is such that the most significant five bits are allocated as the line counting addresses while the least significant ten bits are allocated as the main scanning direction pixel number counting addresses in case the image structure of the image data to be subjected to a rotating process is one pixel in one bit, that the most significant four bits are allocated as the line number counting addresses while the least significant eleven bits are allocated as the main scanning direction pixel number counting addresses in case the image structure of the image data to be subjected to a rotating process is one pixel in two bits, and that the most significant three bits are allocated as the line number counting addresses while the least significant twelve bits are allocated as the main scanning direction pixel number counting addresses in case the image structure of the image data to be subjected to a rotating process is one pixel in four bits.

Accordingly, a twelve-bit down counter is used as each of the pixel data counting units 33 and 34, a five-bit down counter is used as the line data counting unit 35, and the buffer memory reading address selector 36 allocates the fifteen bits of the addresses for reading the image data out of the buffer memory devices 207 and 208 on the basis of the image structure information 4.

Then, when the writing of the input image data for one block to the buffer memory devices 207 and 208 under the control of the buffer memory writing control unit 204 and the buffer memory control unit 206 is completed, with a buffer memory writing process completion signal 9 being thereupon put out, the buffer memory control unit 206 will be in a state of standing by for the output of a buffer memory reading process completion signal 14 from the buffer memory reading control unit 205.

At the point in time when the buffer memory reading process completion signal 14 has been put out after this state, or at the point in time when the buffer memory writing process completion signal 9 has been put out in case no reading process is being performed out of the buffer memory devices 207 and 208 immediately after an image rotating process is started, the buffer memory control unit 206 puts out a buffer memory switching signal 26 to the buffer memory writing control unit 204 and the buffer memory reading control unit 205.

Then, when the buffer memory switching signal 26 is put out, the writing/reading processes of the two buffer memory devices 207 and 208 are switched, and the buffer memory reading control unit 205 is operated to read out the image data written by the buffer memory writing control unit 204, and the image data as processed by a rotating process performed within the block will be put out to a word synthesizing unit 209.

In the subsequent part, a description will be made of the sequence for the generation of the buffer memory reading addresses in the case of each rotating angle.

The buffer memory reading addresses in the case with a rotating angle of 0 degree will be generated in the sequence shown in FIG. 5. This generating sequence is the same as the sequence for generating the buffer memory writing addresses shown in FIG. 2.

The buffer memory reading addresses in the case with a rotating angle of 180 degrees will be generated in the sequence shown in FIG. 6. In FIG. 6, moreover, the numbers "1", "2", "3", "4", ... "n" respectively express one time of reading out of the buffer memory devices 207 and 208. Therefore, the expression, "1→2→3→4", means that the reading process is performed four times in the beginning, and the expression, "5→6→7→8", means that the reading process is performed four times after the series of operations "1→2→3→4". Then, when the reading operations, "(n–3)→(n–2)→(n–1)→n", are performed, then the reading process is performed four times in "1→2→3→4" on the line just above the initial line. Thereafter, the operations are performed in the same manner.

Now, since the bus width of the buffer memory devices 207 and 208 is eight bits, image data in eight bits are read out by a reading process at one time, so that image data in a total of 32 bits will be read out by the reading process performed at four times in each of the reading operations expressed as "1→2→3→4", "5→6→7→8", ..., "(n–3)→(n–2)→(n–1)→n".

The sequence for the generation of the buffer memory reading addresses in a case in which the rotating angle is zero degree and the sequence for the generation of the buffer memory reading addresses in a case in which the rotating angle is 180 degrees will be in the sequence in which the sequence of the data reading operations is reversed for each M/W pieces, namely, the sequence in which the value in the least significant two bits in the pixel data counting unit 34 is reversed.

Now, the operations by the buffer memory reading address generating unit at the time mentioned above may be described as follows.

When a reading process is started for the image data in the buffer memory devices, the pixel data counting unit 33 will be loaded with the value obtained by subtracting one from the number of words $(N_x/(W/N))$ in the main scanning direction, and the line data counting unit 35 will be loaded with the value obtained by subtracting one from the number of lines (M/N) in one block. Then, as the buffer memory reading signal is put into its enabled state, the down counter 34 for the least significant two bits of the pixel data counting unit is put into a counting permitted state, so that value on the counter will be counted down in response to the pulse input of the clock signal entered. When the value indicated on the down counter 34 for the least significant two bits in the pixel data counting unit is decreased to zero, a count down signal RC2 will then be put out for the counter 33 for the more significant bits, and the value on the counter 33 for the most significant ten bits will be counted down.

After that, the pixel data counting unit 33 generates the reading completion signal RC1 when both the counter 33 for the most significant ten bits and the counter 34 for the least significant two bits in the pixel data counting unit are reduced to zero as the result of having counted the pulses in the number of pieces corresponding to (the number of words in the main scanning direction–1). When the pixel data counting unit 33 has thus put out the reading completion signal RC1, the line data counting unit 35 will start counting down the count value, and, at the same time, the pixel data counting unit 33 will be loaded again with the value obtained by subtracting one from the number of words ($N_x/(W/N)$) in the main scanning direction.

When the count values indicated on the counters 33 and 34 respectively assigned to the more significant bits and the less significant bits in the pixel data counting unit, as well as the value indicated on the line data counting unit 35, are all reduced to zero, with the operations described above having been repeated, then the pixel data counting unit 33 puts out the reading completion signal RC1, and the line data counting unit 35 puts out a reading completion signal RC3, and the buffer memory reading process completion signal 14 is thereby put out. In this regard, the output from the counter 34 for the least significant two bits in the pixel data counting unit will have the address reversed in such a situation for the case with the rotating angle of zero degree and for the case with the rotating angle of 180 degrees by the selector 37, which is connected to the rear stage of the counter 34.

Next, the buffer memory reading addresses are generated in the sequence shown in FIG. 7 in the case in which the rotating angle is 90 degrees, and, in the case in which the rotating angle is 270 degrees, the buffer memory reading addresses will be generated in the sequence shown in FIG. 8. The sequence of reading out the data in the line direction is reversed between the sequence for the generation of the buffer memory reading addresses in the case with the rotating angle of 90 degrees and the sequence for the generation of the buffer memory reading addresses in the case with the rotation angle of 270 degrees. That is to say, the value indicated on the counter in the line data counting unit 35 shown in FIG. 4 is reversed.

The operations performed by the buffer memory reading address generating unit at such a time may be described as follows.

When a reading process is started for reading the image data out of the buffer memory devices, the pixel data counting unit 33 will be loaded with the value obtained by subtracting one from the number of words ($N_x/(W/N)$) in the main scanning direction, and the line data counting unit 35 will be loaded with the value obtained by subtracting one from the number of lines (M/N) in one block. Then, when the buffer memory reading signal is put into its enabled state, the down counter in the line data counting unit 35 will be put into a state in which the counting unit 35 is permitted to perform a counting operation, and the value on the counter will be counted down in response to a pulse input of a clock signal entered.

Thereafter, when the value indicated on the down counter in the line data counting unit 35 is reduced to zero as the result of counting the pulses in the number of pieces corresponding to (the number of lines–1), the reading completion signal RC3 is put out for the line data counting unit 35. Then, when this reading completion signal RC3 is thus put out for the line data counting unit 35, the value indicated on the down counter 34 for the least significant two bits in the pixel data counting unit will be counted down, and also the line data counting unit 35 will be loaded with the value obtained by subtracting one from the number of lines (M/N) in one block.

When all of the count values indicated on the counter in the line data counting unit 35 and the count values indicated on the counters 33 and 34 respectively assigned to the most significant bits and the least significant bits in the pixel data counting unit are reduced to zero, the line data counting unit 35 generates the reading completion signal RC3, and the pixel data counting unit 33 generates the reading completion signal RC1, a buffer memory reading process completion signal 14 being thereby put out. In this case, moreover, the output from the counter in the line data counting unit 35 will have the address reversed between the case with the rotating angle of 90 degrees and the case with the rotating angle of 270 degrees by the selector 38 connected to the rear stage of the counter.

Next, a description will be made of the buffer memory control unit 206. On the basis of the image structure information 4, which is set up by the control unit 100, the input image size information 7, the buffer memory writing process completion signal 9, which is put out of the buffer memory writing control unit 204, and the buffer memory reading process completion signal 14, which is put out of the buffer memory reading control unit 205, the buffer memory control unit 206 supplies the buffer memory writing signal 10, the buffer memory writing address 11, buffer memory writing data 12, and a buffer memory reading address 13 to the two buffer memory devices 207 and 208 so as to feed them alternately to each of the M/N lines, thereby performing an operation for writing the image data to the buffer memory devices 207 and 208 and thereby performing control over the reading of image data out of the buffer memory devices 207 and 208. Then, the image data 22 which have been thus read out of the buffer memory devices 207 and 208 are put out to a word synthesizing unit 209 at the next stage.

Next, a description will be made of the word synthesizing unit 209. The word synthesizing unit 209 is constructed in such a manner that it is capable of dealing properly with a plural number of image structures, and the image data 22 which have been read out of the buffer memory devices 207 and 208 are put into this word synthesizing unit 209.

The image data 22 which have been read out by the W-bits from the buffer memory devices 207 and 208 are synthesized into words each consisting of M-bits by the word synthesizing unit 209 on the basis of the image structure information 4 and the rotating angle information 5, both as set up by the control unit 100, and are put out to the page memory device 300.

Figure 9:
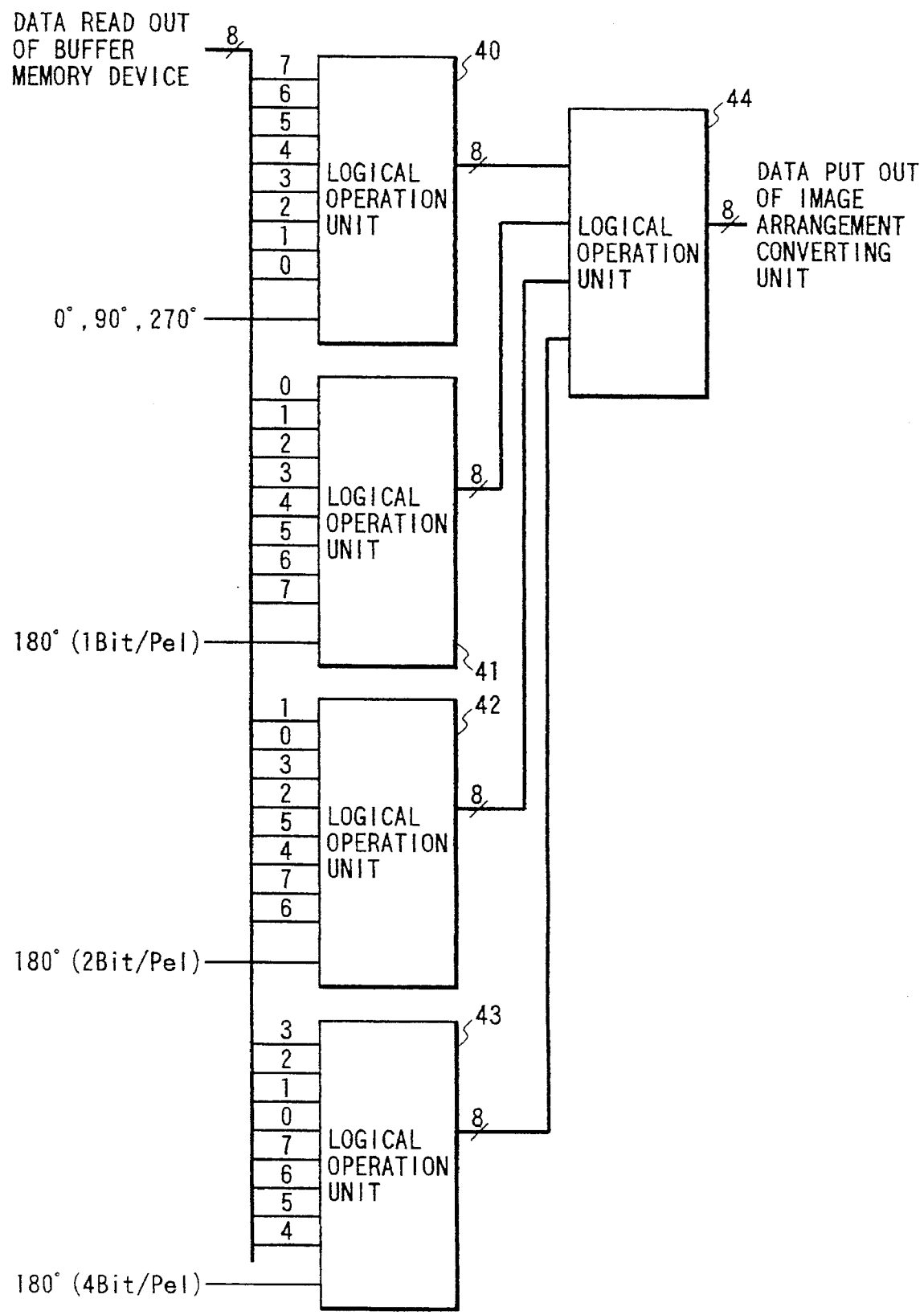
FIG. 9 is a block diagram illustrating the construction of an arrangement converting unit in a word synthesizing unit shown in FIG. 1.
Figure 10:
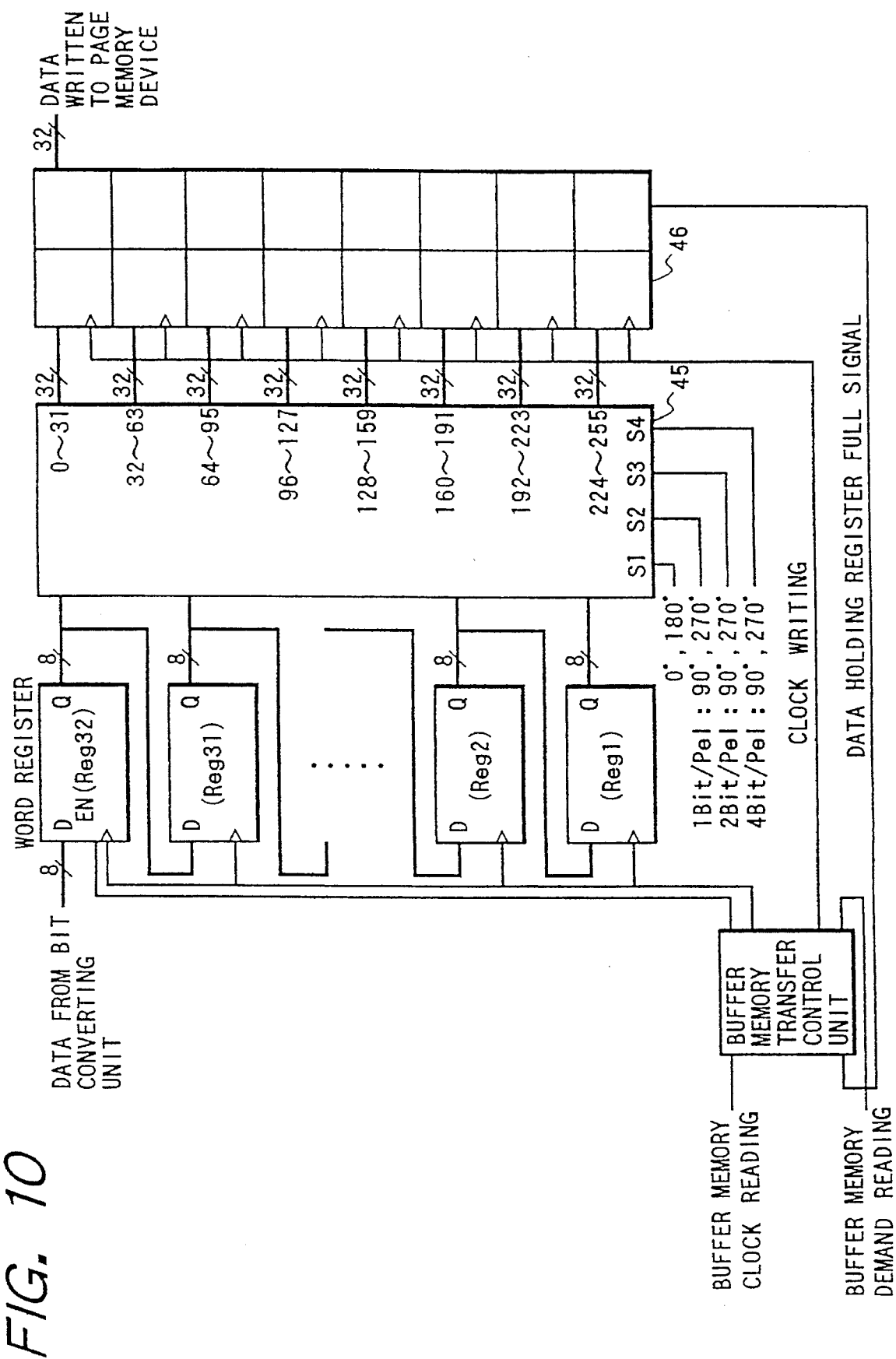
FIG. 10 is a block diagram illustrating the construction of a word converting unit in the word synthesizing unit shown in FIG. 1.

The word synthesizing unit 209 consists of an arrangement conversion processing unit shown in FIG. 9 and a word converting unit shown in FIG. 10. Here, the arrangement conversion processing unit is a unit which changes the arrangement of the pixels in the image data 22 read out of the buffer memory devices 207 and 208, and the word converting unit is a unit which converts the image data subjected to a bit conversion by the arrangement conversion processing unit into word data in M-bits, i.e., the word width in the page memory device 300.

Figure 11:
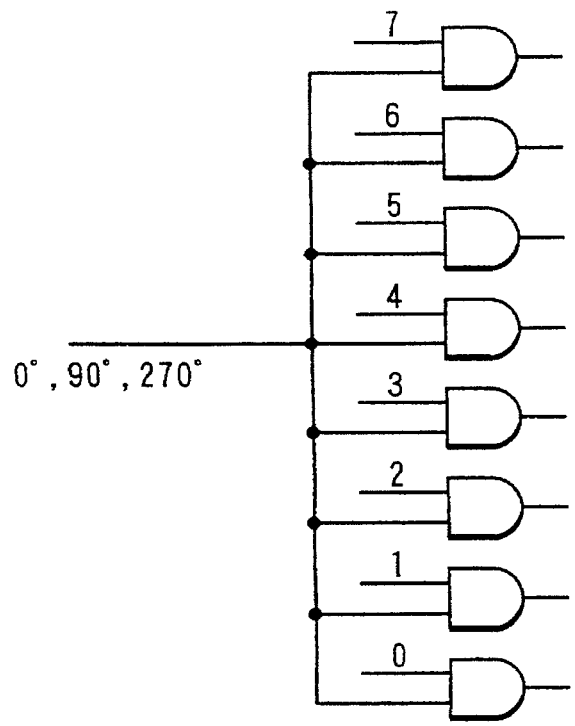
FIG. 11 is a diagram illustrating the construction of a logic operating unit shown in FIG. 9.

The arrangement conversion processing unit is composed of five logical operation units, namely, 40, 41, 42, 43, and 44, as shown in FIG. 9, and the logical operation units 40, 41, 42, and 43 are respectively composed of eight AND gates. FIG. 11 is a diagram illustrating the configuration of the logical operation unit 40, in which the information indicating the rotating angle is put into the input terminal on one side of each of the eight AND gates, and the image data read out of the buffer memory devices 207 and 208 are put one bit by one bit into the input terminals on the other side of the AND gates. The same operations are performed also with respect to the logical operation units 41, 42, and 43.

Further, the logical operation unit 44 is composed of an OR gate with four inputs and one output. Accordingly, only the logical operation unit 40 will put out the image data in a case in which the rotating angle is zero degree, 90 degrees, or 270 degrees, and the image data are then put out via the logical operation unit 44. Also, only the logical operation unit 41 will put out the image data in a case one pixel is formed of one bit, with the rotating angle being set at 180 degrees, and the image data will then be put out via the logical operation unit 44. In the same way, the image data will be put out only from the logical operation unit 42 and the logical operation unit 43, respectively, in a case in which one pixel is composed of two bits, with the rotating angle being set at 180 degrees, and in a case in which one pixel is composed of four bits, with the rotating angle being set at 180 degrees, and the image data will then be put out via the logical operation unit 44.

The word converting unit is provided with 32 pieces of word registers, a word synthesizing selector 45, and a holding register 46, as shown in FIG. 10, and the word converting unit generates eight words of image data, each word being composed of 32 bits, out of 256 bits in total as put out of the 32 pieces of word registers each containing the image data in eight bits. In addition, the word synthesizing register 45 can be constructed with 256 units of selectors each having four inputs and one output.

Now, a description will be made below of the operations performed by the word synthesizing unit 209. In a case in which the rotating angle is zero degree, 90 degrees, or 270 degrees, the image data read out of the buffer memory devices 207 and 208 are in an arrangement consisting of 7, 6, 5, 4, 3, 2, 1, 0 as counted from the most significant bit (MSB), and these image data are put into the arrangement conversion processing unit and then put, as they are, into the word converting unit at the next stage. However, in a case in which the rotating angle is 180 degrees, the image data put into the arrangement conversion processing unit are subjected to a process for a bit-replacing change in the sequence of the pixel data contained in one word data composed of eight bits, as shown in FIG. 9, and are thereafter put into the word converting unit provided at the next stage. This bit-replacing process is controlled by the image structure information 4 as shown in FIG. 9. That is to say, the sequence of bits will be rearranged in the order of 0, 1, 2, 3, 4, 5, 6, 7 from the MSB, in case one pixel is formed of one bit, the sequence of bits will be rearranged in the order of 1, 0, 3, 2, 5, 4, 7, 6 from the MSB in case one pixel is formed of two bits, and the sequence of bits will be rearranged in the order of 3, 2, 1, 0, 7, 6, 5, 4 from the MSB in case one pixel is formed of four bits, and the rearranged bits are put into the arrangement conversion processing unit in each case.

The image data put out of the arrangement conversion processing unit and fed into the word converting unit will be put, in every word data unit composed of eight bits, into the word register. The word register is composed of shift registers for eight bits per word×32 words, and the image data from the arrangement conversion processing unit are stored one by one in regular sequence in the word register. Then, when 32 words of image data are stored in the word register, the image data in a total of 32 words each composed of eight bits are passed through a word synthesizing selector 45, which is provided for converting the image data into data composed of eight words each consisting of 32 bits, and then the data are stored in the data holding register 46.

The word synthesizing selector 45 is composed of a combination of 256 units of selectors each of which selects one bit out of the four bits and puts out the selected bit, and the word synthesizing selector 45 thus performs a process for converting image data composed of 32 words each consisting of eight bits into image data composed of eight words each consisting of 32 bits in such a manner as shown in FIGS. 12, 13, 14, and 15 on the basis of the image structure information 4 and the rotating angle information 5.

The word synthesizing unit 209 performs the processing operations mentioned above, and it will be described here, with reference to FIGS. 12 through 15, how the image data are arranged by this word synthesizing unit 209.

Figure 12:
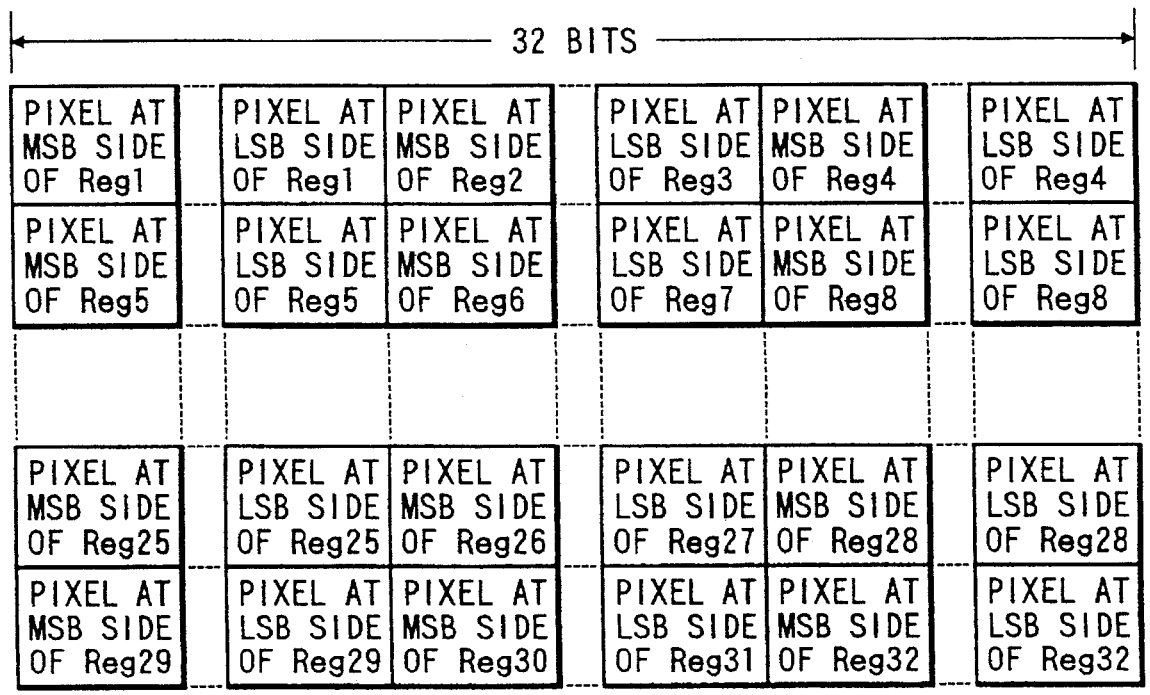
FIG. 12 is a chart illustrating the particulars of the arrangement converting process performed in a case in which the rotating angle is zero degree and 180 degrees.
Figure 13:
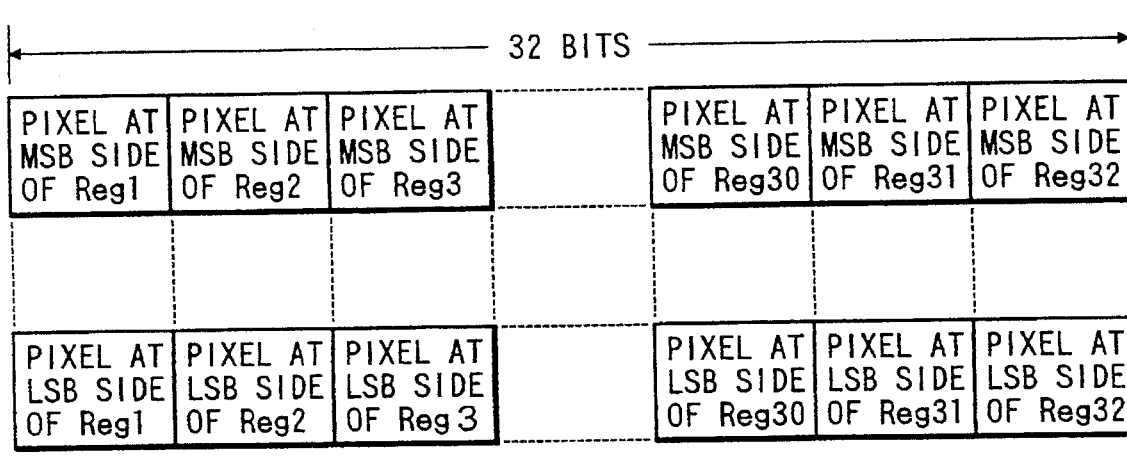
FIG. 13 is a chart illustrating the particulars of the arrangement converting process performed in a case in which the rotating angle is 90 degrees and 270 degrees and one pixel is formed of one bit.
Figure 14:
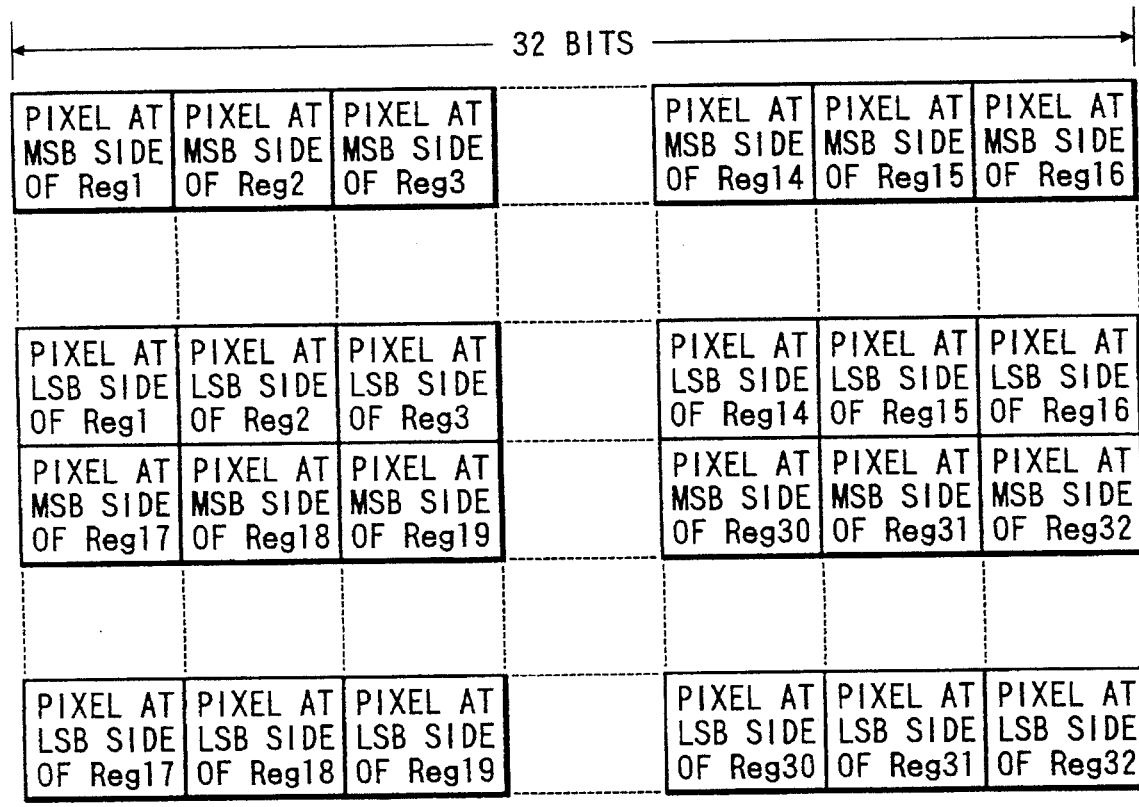
FIG. 14 is a chart illustrating the particulars of the arrangement converting process performed in a case in which the rotating angle is 90 degrees and 270 degrees and one pixel is formed of two bits.

FIG. 12 is a chart illustrating the particulars of the arrangement conversion process to be performed in a case in which the rotating angle is zero degree and 180 degrees. FIG. 13 is a chart illustrating the particulars of the arrangement conversion process to be performed in a case in which the rotating angle is 90 degrees and 270 degrees, with one pixel being formed of one bit. FIG. 14 is a chart illustrating the particulars of the arrangement conversion process to be performed in a case in which the rotating angle is 90 degrees and 270 degrees, with one pixel being formed of two bits. FIG. 15 is a chart illustrating the particulars of the arrangement conversion process to be performed in a case in which the rotating angle is 90 degrees and 270 degrees, with one pixel being formed of four bits.

In a case in which the rotating angle is zero degree and 180 degrees, the image processing apparatus performs a process for converting the image data in four words each consisting of eight bits in the sequence as read out of the buffer memory devices 207 and 208 into data composed of 32 bits per word without any regard to the type of the image structure as shown in FIG. 12.

However, in the case in which the rotating angle is 90 degrees and 270 degrees, the manner how the image data are processed will be different for different image structures, i.e., one pixel formed of one bit, one pixel formed of two bits, and one pixel formed of four bits, and, in the case of one pixel formed of one bit, each of the bits in a structure consisting of 32 words each consisting of eight bits as read out of the buffer memory devices 207 and 208 will be subjected to a process for writing one bit by one bit, i.e., one pixel by one pixel, as from the most significant bit in the 32 bits forming each of the eight words, as shown in FIG. 13. Further, in the case in which one pixel is formed of two bits, the image data in the structure composed of 16 words each consisting of eight bits as read out of the buffer memory devices 207 and 208 will be subjected to a process for writing two bits at a time as from the most significant bit in each of the four words each consisting of 32 bits, i.e., one pixel at a time, as shown in FIG. 14. Furthermore, in the case in which one pixel is formed of four bits, the image data in the structure composed of eight words each consisting of eight bits as read out of the buffer memory devices 207 and 208 will be subjected to a process for writing four bits, i.e., one pixel, at a time as from the most significant bit in the 32 bits in each of the two words, as shown in FIG. 15.

In this regard, it is important to note that the image data written to each of the blocks shown in FIGS. 12 through 15 are not any one bit of the image data but ultimately and solely "one pixel". In this example of preferred embodiment, the process described above is performed in each of the respective cases in which one pixel is formed of one bit, in which one pixel is formed of two bits, and in which one pixel is formed of four bits.

With the performance of the operations described above, the image data read out of the buffer memory devices 207 and 208 are converted in a unit of eight bits per word×32 words into data composed of eight words each consisting of 32 bits.

The image data thus converted by the word synthesizing unit 209 into 32 bits per word, which is the data width in the page memory device 300, are written sequentially in the order specified by page memory writing addresses 24 as calculated by a page memory writing address generating unit 210, and these operations bring the image rotating process to its completion. The writing of the image data to the page memory device 300 upon completion of the rotating process on them is performed by hand-shake control between a page memory writing demand signal 25 and a page memory writing permitting signal 27.

Figure 16:
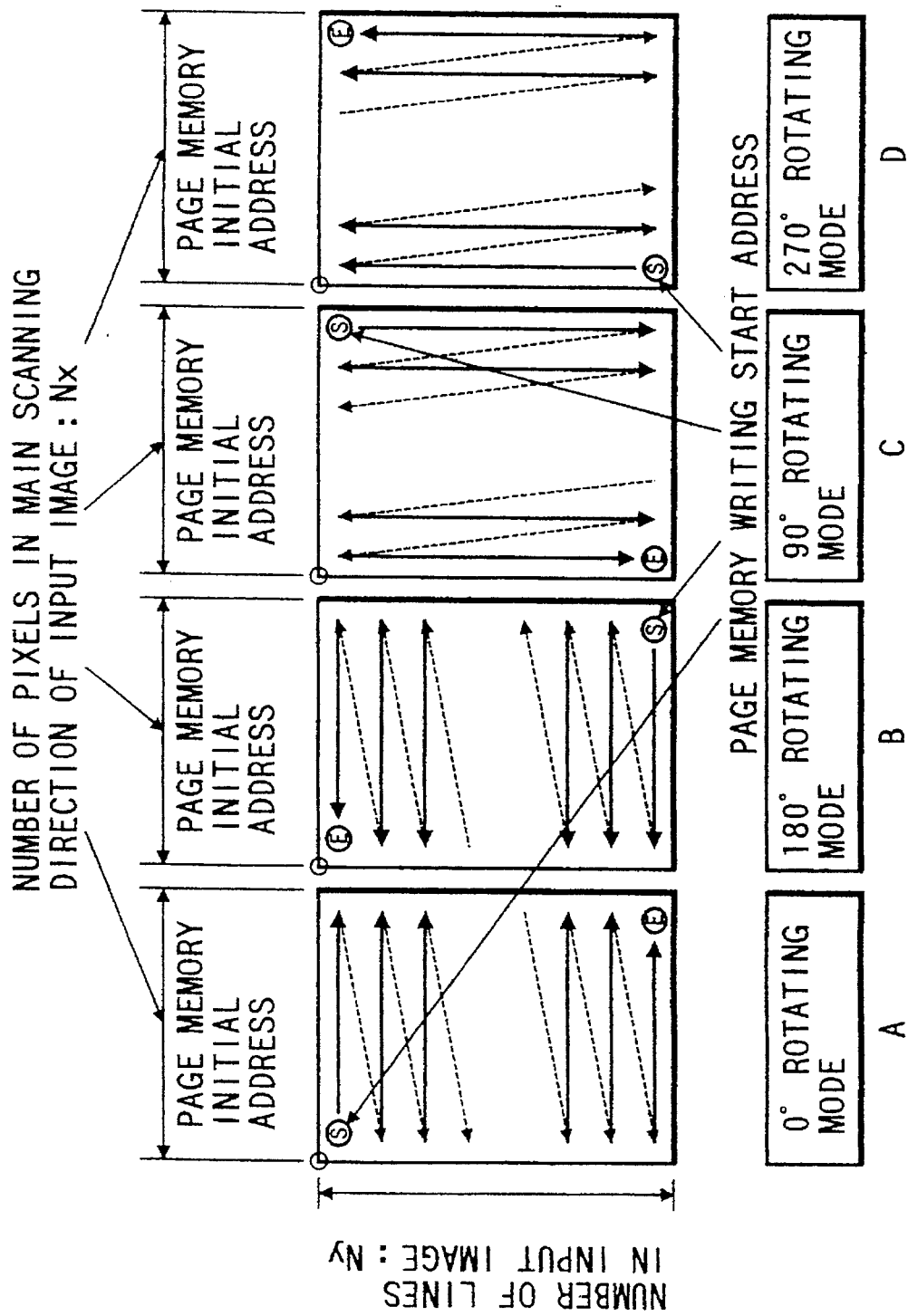
FIG. 16 is a chart illustrating the sequence for the generation of page memory writing addresses.
Figure 17:
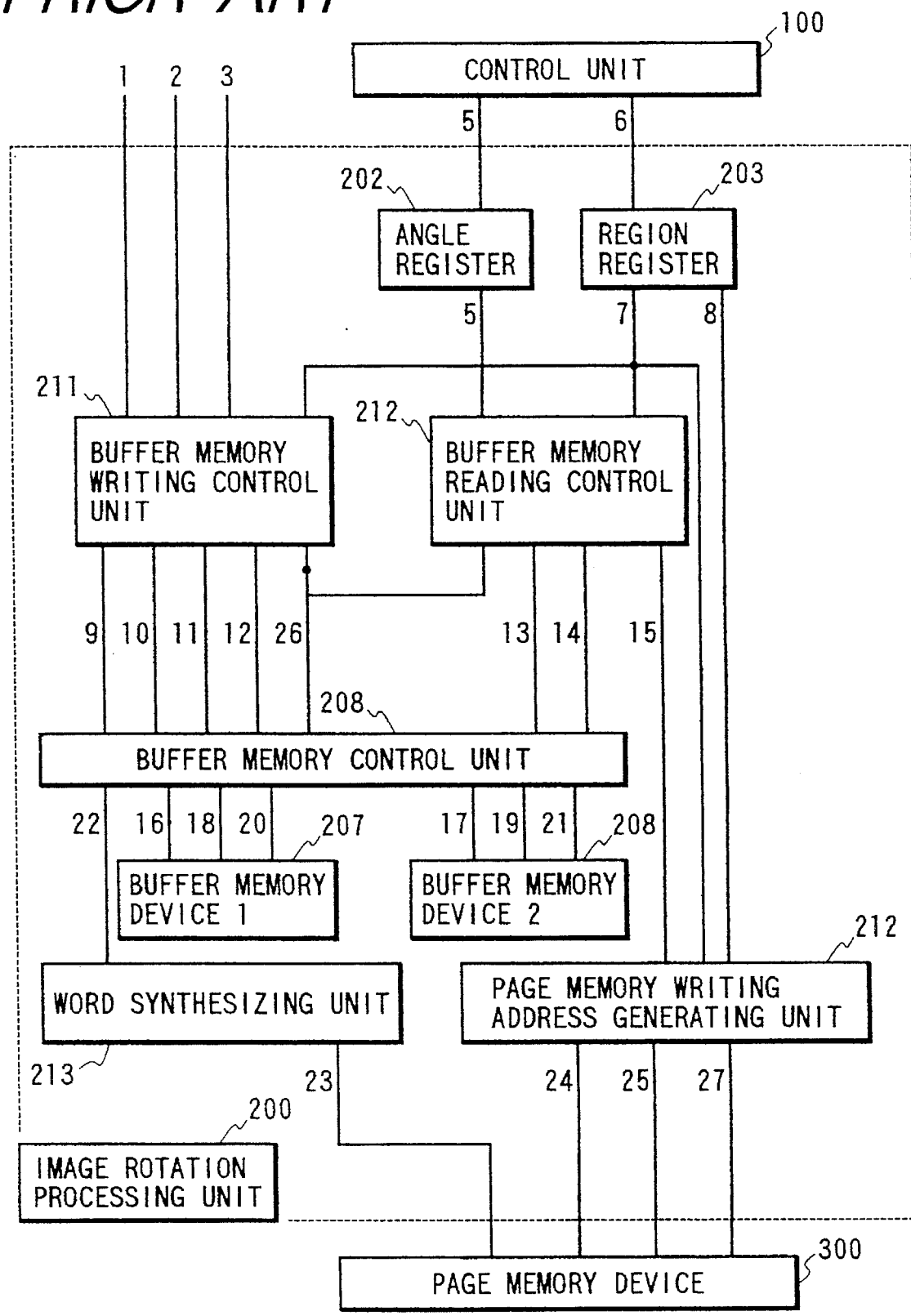
FIG. 17 is a block diagram illustrating an example of the construction of a conventional image processing apparatus.

FIG. 16 is a chart illustrating the sequence in which the page memory writing address is generated for each rotating angle. The page memory writing address 24 is calculated on the basis of the rotating angle information 5 set up by the control unit 100, the input image size information 7, which is included in the input image information 6, and the writing start point address 8 (hereinafter referred to as the base address) for the page memory device 300. Moreover, this writing start point is indicated by a mark with a circle enclosing "S" in FIG. 16.

In the following part, a description will be made of a method of calculating the page memory writing address 24 for each rotating angle.

In the case in which the rotating angle is zero degree, the addresses in the main scanning direction is counted up from zero through $((N_x/(M/N))-1)$, and, when the count value has attained $((N_x/(M/N))-1)$, the addresses in the main scanning direction are reset to zero and at the same time $(N_x/(M/N))$ is to be added to the addresses in the line direction. The operations described above are repeated until the addresses in the main scanning direction attain $((N_x/(M/N))-1)$ while the addresses in the line direction attain $((N_y/(M/N))-1)$. Then, the value obtained by adding the base address value to the value mentioned above (i.e., the address in the main scanning direction+the address in the line direction) is put out as the page memory writing address 24.

In the case in which the rotating angle is 180 degrees, the same operations as those performed in the case with the rotating angle of zero are performed, but the value obtained by subtracting the value of (the address in the main scanning direction+the address in the line direction) from the base address is put out as the page memory writing address 24.

In the case in which the rotating angle is 90 degrees, the address in the line direction is changed from zero to $((N_x/(M/N))\times1)$, $((N_x/(M/N))\times2)$, ..., $((N_x/(M/N))\times((N_x/(M/N))-1))$, and, when $((N_x/(M/N))\times((N_x/(M/N))-1))$ is attained, the address in the line direction is reset to zero, and also the address in the main scanning direction is counted up.

The operations described above are repeated until the address in the main scanning direction attains $((N_y/(M/N))-1)$ and until the address in the line direction attains $((N_x/(M/N))\times((N_x/(M/N))-1))$, and, as the page memory writing address 24, the value obtained by adding the base address to the above-mentioned value (the address in the line direction—the address in the main scanning direction) is put out.

In the case in which the rotating angle is 270 degrees, the same operations as those performed in the case with the rotating angle of zero degree are performed, but, as the page memory writing address 24, the value obtained by subtracting the value of (the address in the line direction—the address in the main scanning direction) from the base address is put out.

By the performance of the processing operations described above, it is made possible to perform a rotating process on the image data without any regard to the type of the image structure.

In the foregoing part, an example of preferred embodiment of the present invention has been described, but it goes without saying that the present invention is not to be limited in any way to the example of preferred embodiment described above, but may be modified in various ways without changing the main purports of the present invention.

For example, the arrangement converting unit shown in FIG. 9 may be omitted, and the word converting unit may be constructed so as to perform a conversion in a manner suitable for each number of tonal ranges for the rotating angle of 180 degrees.

Further, the example of preferred embodiment described above is constructed so as to use two buffer memory devices alternately, but one buffer memory device may be used with a writing operation and a reading operation being performed in regular sequence.

Moreover, the example of preferred embodiment described above relates to a construction of an image processing apparatus which performs writing operations of image data to the buffer memory devices in predetermined sequence and yet performs addressing operations suitable for the rotating angle at the time of a reading operation, but it is feasible to reverse the operating procedure so as to perform an addressing operation in a manner suitable for the particular rotating angle and then to perform reading operations in predetermined sequence.

Furthermore, the specified angle of rotation may be any angle, in addition to zero degree, 90 degrees, 180 degrees, and 270 degrees mentioned here.

Still further, it is obvious that the number of tonal ranges for each pixel may be the number of bits which each pixel has, i.e., the number of data in the particular pixel.

As it is evident from the description given above, the present invention offers an image processing apparatus which is not provided with any plural number of processing units for writing image data to the buffer memory devices, or any plural number of processing units for reading image data out of the buffer memory devices, or any plural number of processing units for synthesizing operations, such a plural number of processing units being switched from one to another in a manner suitable for the type of image data to be processed, but is capable of performing a rotating process for any of various types of image data different in the number of bits forming one pixel, using the same apparatus, by performing the processing operations for generating the writing and reading addresses in the buffer memory devices on the basis of the number of bits in one pixel of the image data entered into them. Therefore, the present invention can offer an image processing apparatus which, though formed in a small-scale circuit construction, is capable of performing a rotating process at a specified rotating angle on a plural number of types of image data different in image structure.

What is claimed is:

1. An image processing apparatus which puts out image information having data in N bits for one pixel (where N is an integral number not less than one) to a page memory device capable of making access to the image information by M bits (where M is an integral number larger than N) as a unit while performing a rotating process on the image information, said image processing apparatus comprising:

a buffer memory device, which is capable of making access by W bits as a unit (where W is an integral number satisfying the following condition, N<W≦M);

writing control means, which works for sequentially entering image information for (M/N) lines as a unit, also for sequentially generating addresses in a prescribed order on the basis of image size information, and for sequentially writing the image information for each unit thus entered to said buffer memory device for every (W/N) pixels;

reading control means, which works for sequentially generating addresses in accordance with an angle of rotation and for sequentially reading the image information for the (M/N) lines out of the image information stored in said buffer memory device;

an image data synthesizing unit, which generates (W/N) pieces of data in M bits from the M pieces of data as sequentially read out by said reading control means on the basis of the angle of rotation and the number N of bits per one pixel; and image output means, which sequentially generates addresses in accordance with the angle of rotation and puts out the (W/N) pieces of data generated by said image data synthesizing unit to individual corresponding addresses in the page memory device.

2. The image processing apparatus according to claim 1, wherein said reading control means reverses the sequence of the addresses for every (M/W) pieces in case the angle of rotation is 180 degrees.

3. The image processing apparatus according to claim 1, wherein said buffer memory device comprises two memory devices, and wherein said image processing apparatus further comprises control means which effects a changeover between said two memory devices in such a manner that said reading control means reads out of one of said two memory devices while said writing control means writes to the other of said two memory devices.

4. An image processing apparatus which puts out image information having data in N bits for one pixel (where N is an integral number not less than one) to a page memory device capable of making access to the image information by M bits (where M is an integral number larger than N) as a unit while performing a rotating process on the image information, said image processing apparatus comprising:

a buffer memory device, which is capable of making access by W bit as a unit (where W is an integral number satisfying the following condition, N<W≦M);

writing control means, which works for sequentially entering image information for (M/N) lines as a unit, also for sequentially generating addresses in a prescribed order on the basis of image size information, and for sequentially writing the image information for each unit thus entered to said buffer memory device for every (W/N) pixels;

reading control means, which works for sequentially generating addresses in accordance with an angle of rotation and for sequentially reading the image information for the (M/N) lines out of the image information stored in said buffer memory device;

pixel arrangement converting means, which converts an arrangement of W-bit image information as read by said reading control means out of said buffer memory device on the basis of the angle of rotation and the number N of bits per one pixel;

an image data synthesizing unit, which generates (W/N) pieces of data in M bits from the M pieces of data converted by said pixel arrangement converting means on the basis of the angle of rotation and the number N of bits per one pixel; and image output means, which sequentially generates addresses in accordance with the angle of rotation and puts out the (W/N) pieces of data generated by said image data synthesizing unit to individual corresponding addresses in the page memory device.

* * * * *